United States Patent
Barrett et al.

(10) Patent No.: US 6,820,084 B2
(45) Date of Patent: Nov. 16, 2004

(54) METHOD AND SYSTEM FOR PUSHING INFORMATION TO A CLIENT AN INFORMATION PROCESSING SYSTEM

(75) Inventors: Robert Carl Barrett, San Jose, CA (US); Paul Philip Maglio, Santa Cruz, CA (US); George Milton Underwood, IV, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 09/864,537

(22) Filed: May 23, 2001

(65) Prior Publication Data

US 2002/0054057 A1 May 9, 2002

Related U.S. Application Data

(62) Division of application No. 08/979,064, filed on Nov. 26, 1997, now Pat. No. 6,490,584.

(51) Int. Cl.[7] ................................................ G06F 17/30
(52) U.S. Cl. ................................ 707/10; 707/3; 707/4; 707/6
(58) Field of Search .............................. 707/10, 6, 4, 3, 707/202, 201, 2, 1; 715/513; 705/9, 4, 27; 709/218

(56) References Cited

U.S. PATENT DOCUMENTS

| | | | |
|---|---|---|---|
| 5,471,629 A | * | 11/1995 | Risch ........................ 707/201 |
| 5,592,664 A | * | 1/1997 | Starkey ........................ 707/1 |
| 5,918,014 A | | 6/1999 | Robinson |
| 6,014,638 A | | 1/2000 | Burge et al. |
| 6,134,548 A | | 10/2000 | Gottsman et al. |
| 6,202,062 B1 | | 3/2001 | Cameron et al. |

\* cited by examiner

*Primary Examiner*—Jean M. Corrielus
(74) *Attorney, Agent, or Firm*—Robert Buckley; Daniel E. Johnson

(57) ABSTRACT

A user-centered push system monitors user activity to build a dynamic model representing probable user interests. The model is used to drive a search for information relevant to these interests. Such information, when located, is pushed to the user. In a specific embodiment, the information is scrolled across a ticker-tape display along the bottom of the user's monitor. Typically, headline and stock quote type information in abbreviated form is scrolled. By clicking on a ticker-displayed abbreviated item, the user initiates a display of a more complete version of the information. In one embodiment, the invention defines a method using a dynamic user model to locate and push information to a client for display. Alternatively a client reformats the information and archives it for later use. In another embodiment, changes in the dynamic model trigger the information pushing. Information is located and pushed from sources within and also external to a user environment, including from an intranet, from the Internet and from the World-Wide-Web.

25 Claims, 11 Drawing Sheets

METHOD AND SYSTEM FOR PUSHING INFORMATION TO A CLIENT AN INFORMATION PROCESSING SYSTEM

RELATED APPLICATION AND CLAIM OF PRIORITY

This is a divisional application of, and claims priority from U.S. patent application, Ser. No. 08/979,064, filed Nov. 11, 1997, now U.S. Pat. No. 6,490,584, entitled "User-Centered PUSH Methods and System".

BACKGROUND

1. Field of the Invention

The invention relates to information processing and communication systems, and in particular to methods and systems for discovering and pushing network information based upon user activity.

2. Background of the Invention

Push technology has become popular in the public eye as an answer to a quantity-of-information problem. An extended digital world we call cyberspace is composed of information sources including the world-wide web, Usenet news, electronic mail, as well as personal data—such as the contents of a user's hard drive and a personal digital assistant.

Cyberspace contains an incredible wealth of valuable information. However, this information is difficult to obtain, and is almost impossible to synthesize and to process. Yet, information on just about anything is available, and it comes in countless different formats. Generally, finding what a user wants requires an enormous amount of searching. Often this search process is so tedious that much of the available information is never sought or found in the first place.

Push technology attempts to solve this problem by selecting relevant information and bringing it to the user. Current push technology attempts to model a user's interests by having a user check off boxes corresponding to various predefined interests. The push technology then uses the model to locate and deliver information corresponding to the checked off interests.

Under such a model, a world of available information is considered to be constantly changing, while the user's interests are assumed to remain fairly static, as indicated by the user interest check list. The perception is that push technology will eliminate the user's need to actively participate in the search for information that he or she is interested in.

And indeed that's true. But one unintended consequence of these models is that much irrelevant information, matching the somewhat primitive selections offered in the check lists, is returned as well. Thus one major problem remaining with current push technology is the problem of separating the wheat from the chaff-sifting through vast amounts of irrelevant information to find that which is pertinent and valuable to a specific user. A significant part of this problem stems from continued reliance upon a user interest model which remains sparse and static.

In part this overload of irrelevant information is due to the availability of faster processors and higher bandwidth data transfer capabilities which allow information to be delivered in a media-rich, TV-like way. Near instantaneous feedback and check-list mechanisms for specifying content are resulting in a large user base for the current push technology.

Recent commercial software applications such as The Pointcast Network™, Marimba's Castanet Tuner™, Netscape's Netcaster™, and Microsoft's CDF channels, as well as several other research and commercial news clipping and information delivery services have provided software which promises to dynamically deliver intranet and Internet information to user desktops.

Under current models, the responsibility for choosing what information gets delivered stays mostly in the hands of the software and the server from which the information comes. Users choose from a series of 'channels' or categories, and receive all of the content associated with that category through the service's proprietary software—in the same way that a TV viewer selects a channel and watches all the content provided by that TV channel. The user's choice is limited to the number of checkboxes or channels the push software provides. If the user wants to choose from a larger variety of more specific topics and interests, the model is no longer useful.

Recent estimates suggest that there will be one billion web pages by the year 2000. Even if only one out of every 1000 of those pages is available on an equivalent content channel, users will be required to sift through one million channels to enjoy 'passive' delivery of information.

The models created by the current push technology are quasi-static, and require direct intervention on the part of the user to change the topics of interest. Yet, recent research has shown that a user's interests vary at very short intervals—the changes in a user's interests occurring much more rapidly than changes occurring in the information sources from which the information is obtained.

Also, in current push technology, the output of information is limited to current push technology's proprietary output screens. The information is being delivered in a format determined by the information supplier and not by a user's specific needs. Such prepackaged information is often difficult to modify for specific user needs.

A need exists for a push technology that solves the glut of information problem by retrieving information likely to be of interest to a user. A need also exists for a push technology which can provide the information in a form easily adapted to a user's specific format needs.

SUMMARY OF THE INVENTION

These needs—(1) locating information relevant to a user's current interests, and (2) presenting the information in a manner suited to suit a user's specific needs—are met by the present invention, a user-centered push technology.

The invention meets these two critical needs by modeling the user's interests in a dynamic way, and by using the model to locate and to deliver information that remains relevant as the user's needs change.

The present invention is based upon the idea that people and their interests are dynamic, and therefore that the information which a user deems relevant constantly changes because his interests change. Therefore, building and maintaining a reliable, useful user model requires data from numerous sources. What the user is currently browsing, for instance, or topics which he has recently written about or read (in a document, an e-mail, or a new posting), applications he uses, as well as keyboard and mouse activity are all valuable sources of user model information.

In a specific embodiment, the invention defines a method for pushing information to a client in an information processing system. The method includes gathering facts concerning user activity, and using the facts to build a dynamic user model. The method also includes deriving new facts from the facts within the dynamic model, and incorporating the new facts into the model thereby developing probable user interests. Using those interests to locate information either inside the system or outside, such as via a network connection with remote databases. And finally, by pushing the located information to the user in a minimally distracting manner. Alternatively, the information is locally formatted and archived for later use.

Another specific embodiment of the invention defines a system for determining what information is relevant to a user's changing interests, locating such information, and pushing the information to a client triggered on the changes in user interests. The system builds a dynamic user model that contains linked facts defining probable user interests. Independent fact deriving agents elicit new facts from the existing facts, evolving the probable user interests to a level of confidence sufficient for some facts to be pushed to the client. Typically, the pushed facts are displayed for the user, or, alternatively, they are reformatted and archived for later use.

The advantages of a user-centered push technology are that information is located and pushed based on changing user interests, and the information is easily reformatted and archived for later use.

BRIEF DESCRIPTION OF THE DRAWING

For a further understanding of the objects, features and advantages of the present invention, reference should be had to the following description of the preferred embodiment, taken in conjunction with the accompanying drawing, in which like parts are given like reference numerals and wherein.

DESCRIPTION OF THE PREFERRED EMBODIMENT

Introduction

Figure 1:
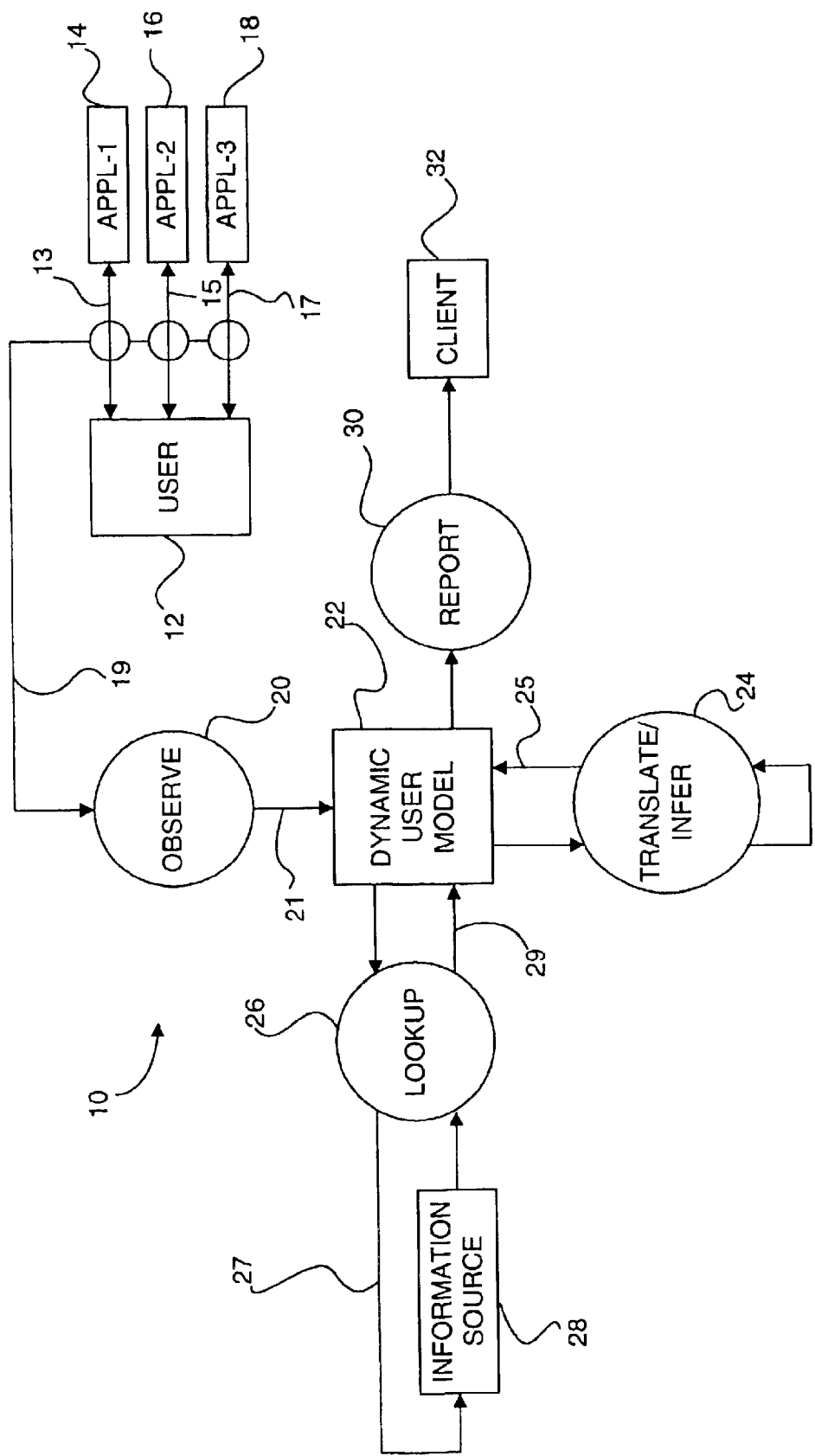
FIG. 1 is a block diagram illustrating an embodiment of a user-centered push system.

With reference to FIG. 1 there is shown a block diagram illustrating a user-centered push system according to one aspect of the present invention. The system is designated generally by the numeral 10 and includes a system user 12, system applications 14, 16, 18, observer agents 20, a dynamic user model 22, translation/inference agents 24, information lookup agents 26, information sources 28, a reporter agent 30, and an information receiving client 32.

In a specific embodiment, the user-centered push system 10 is implemented as software running on a programmable information processing system (not shown). The system user 12 (hereafter "user 12") interacts with user-invoked system applications 14, 16, 18, e.g., via a keyboard, a pointing device, and a display monitor (not shown).

The interactions, 13, 15, 17, between the user 12 and the system applications 14, 16, 18 are monitored 19 by one or more observer agents 20. Each agent is an independent software thread operating within the user-centered push system 10. The observer agents 20 convert the monitored observations into primitive facts 21 which are placed into the dynamic user model 22.

The Word "Fact" Has Special Meaning

The word "fact," both in the singular and in the plural, and when modified by an adjective such as in "primitive fact," means a quantum of information. A fact is represented within the information processing system as a data structure which contains the quantum of information. Facts, once created, are stored in the dynamic user model 22.

The translation/inference agents 24 (hereafter "inference agents 24") examine all the facts within the dynamic user model 22, and derive new facts 25 which are also placed into the dynamic user model. The lookup agents 26 independently examine all the facts within the dynamic user model 22 and use some of the facts to create addresses 27 which are then used to retrieve information from information sources 28. The retrieved information is converted into yet additional facts 29 which are also placed into the dynamic user model 22 by the retrieving lookup agent 26.

In a specific embodiment of the user-centered push system 10, the inference agents 24 and the lookup agents 26 continuously examine all current facts within the dynamic user model 22. These agents 24, 26, derive additional new facts whenever the existing facts make that possible. The new facts are also placed within the dynamic user model 22. In this iterative manner, the primitive facts which are defined by observed user interactions are being continuously refined and evolved.

Figure 2:
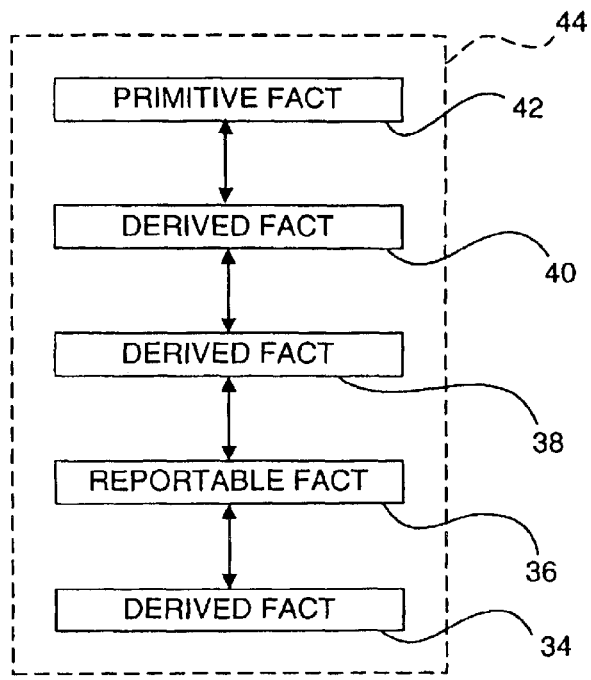
FIG. 2 is a block diagram illustrating a simplified fact net.

Facts derived from other facts by inference and by lookup are linked with the facts from which they are derived. This relationship is illustrated in the block diagram of FIG. 2. The diagram includes a derived fact 34, which is linked with and derived from a derived fact, identified as a reportable fact 36, which is linked with and derived from another derived fact 38, which is linked with and derived from another derived fact 40, which is linked with and derived from a primitive fact 42. These linked facts form a fact net, designated and enclosed by the broken line 44. The fact net 44 is located within the dynamic user model 22.

The Phrase "Fact Net" Defined

A fact net is initially a single primitive fact. Later, it is a group of linked facts. Each fact net defines one or more evolving probable user interests, based initially upon one or more primitive facts obtained by monitoring specific user interactions within the information processing system. Over time, the iterative processes of inference and lookup described above cause many of the fact nets within the dynamic user model 22 to evolve to a point at which each fact net represents one or more probable user interests, each having a reasonable level of confidence.

In a specific embodiment, the reporter agent 30 (hereafter "reporter 30") examines all the facts within the dynamic user model 22. The reporter 30 is looking for facts of a specific type believed to represent a probable user interest with sufficient confidence to be reported to the receiving client 32. Such facts are reportable facts. When the reporter 30 finds a reportable fact, it delivers a copy of the fact to the client.

In another specific embodiment of the invention, the client displays its received facts on a display monitor for viewing by the user. See, for example, FIG. 3, a partial block diagram illustrating such an embodiment of the user-centered push system 10. The reporter agent 30 delivers reportable facts to the client 32 which in turn displays its received facts 46 across the bottom of a display monitor 48 in the form of a moving ticker tape.

A Simplified User-centered Push System

In a simplified embodiment of the user-centered push system 10, at least one observer agent 20 is provided for monitoring a selected event 13 of an environment (e.g., the user 12, the application 14, and the user-application interaction 13). The observer agent 20 uses the monitored event 13 to create a primitive fact 21 which represents a status of the monitored event 13. The primitive fact 21 is placed into a dynamic user model 22 where it is available for a reporter agent 30 for delivery to a client 32. The specific embodiment includes no inference agent 24 nor lookup agent 26 and therefore lacks the fact refining power of the more complex system described above. Yet, for certain applications, this simple system is able to build a user model which incorporates information obtained by monitoring events in an environment. The model is used to push the facts within the dynamic user model 22 to the client 32.

A User-centered Push Method

Finally, another specific embodiment of the user-centered push system 10 of FIG. 1 defines a method for pushing information, e.g., selected facts 21, 25, 29, to a client 32 in an information processing system (not shown). The defined method includes the following steps. Observations concerning user activity are gathered as facts and formed into fact nets. New facts are derived from the facts within the fact nets. The new facts are then incorporated into the existing fact nets. Ultimately, reportable facts are identified and are then pushed to a system client.

The user-centered push system illustrated in FIG. 1 provides a mechanism for practicing the above described method. The observer agents 20 monitor user activity 13, 15, 17 and create primitive facts 21—the gathered facts—and form the gathered facts into fact nets within the dynamic user model 22. The inference agents 24 and the lookup agents 26 derive new facts 25, 29 from the facts within the fact nets, and incorporate the new facts into the fact nets. The reporter agent 14 identifies reportable facts, and then pushes, i.e., delivers, the reportable facts to the client 32.

Observing User Activity

As illustrated in FIG. 1, the observing agents 20 are connected for monitoring 19 user activity 13, 15, 17. The information processing system defines a user environment, shown in FIG. 1 by the user 12, and the user-invoked system applications 14, 16, 18. In a more general sense, the user environment includes such matters as what the user is currently browsing, topics which he has recently written about or read (in a document, an e-mail, or a new posting), applications he uses, as well as keyboard and mouse activity. These are all valuable sources of user model information. In short, the user environment includes every interaction the user has with any part of the information processing system.

In a specific embodiment, the observing agents 20 are each connected to monitor a different type of user interaction with the various parts of the information processing system. The specifics of any observing agent 20 vary depending upon the type of activity being monitored. But each observing agent detects the occurrence of the type of event it is meant to monitor, and uses the occurrence of the event to create one or more primitive facts which represent the monitored event. In one specific embodiment of an observing agent 20, the primitive fact represents a program state of the event monitored. In another specific embodiment of an observing agent 20, the primitive fact represents a data string. In yet another specific embodiment of an observing agent 20, the primitive fact represents a numerical quantity.

The phrase 'gathering facts related to user activity' means that one or more observing agents 20 monitor their respective user activities, each observing agent defining facts corresponding to the monitored events, and create corresponding primitive facts.

Forming Fact Nets

Figure 4:
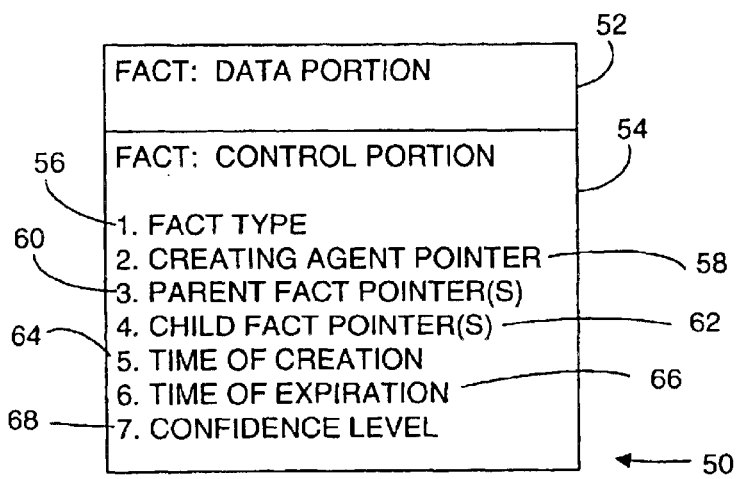
FIG. 4 is a schematic diagram illustrating a specific fact data structure.

It follows therefore that the word fact, as used in this patent application, defines a quantum of information. A fact is represented in the information processing system as a data structure. FIG. 4 is a schematic diagram illustrating a data structure of a specific embodiment of a fact as used in the present invention. The data structure is designated generally by the numeral 50, and includes a fact data portion 52 and a fact control portion 54. In the specific fact data structure illustrated in FIG. 4, the control portion 54 includes the following control fields: a fact type 56, a creating agent pointer 58, at least one parent fact pointer 60, at least one child fact pointer 62, a time of creation 64, a time of expiration 66, and a fact confidence level 68.

The fact data portion 52 holds the quantum of information discussed above, be it a machine state code, a data string, a numeric value, or any other data type used to represent a specific monitored user activity. The agent which creates the fact uses a fact data structure 50 and places the quantum of information into the data portion 52. The creating agent also enters an appropriate code into the fact type field 56, places a pointer which identifies the creating agent into the control field 58, and places a time-of-creation code into the control field 64.

A fact net is a set of facts for which membership in the set requires that one member be derived from at least one other member. In addition, each fact net includes at least one primitive fact.

The fact, or facts, from which another fact is derived is referred to as a parent(s) of the derived fact. The derived fact is referred to as a child of the parent fact(s). A fact can be the parent of more than one child, and a fact can be the child of more than one parent. There is no limit to the number of parents which a particular fact may have, nor the number of child facts which may be directly descended from a particular fact. The parent fact pointer(s) 60 and the child fact pointer(s) 62 in each fact data structure are used to establish the linkages between facts illustrated in simple fashion in FIG. 2.

An alternative definition of a fact net is a group of linked facts. See, for example, FIG. 5, a schematic diagram which illustrates a highly evolved fact net, designated generally by the numeral 70, and including primitive facts ("PF") 72, 74, many derived facts ("DF"), examples of which are designated 76, 78, and several reportable facts ("RF") 80, 82, 84.

A primitive fact net is created by an observing agent 20 when the agent creates a primitive fact. The primitive fact net has one member, its primitive fact. Therefore it is now reasonable to state that the act of forming fact nets includes the defining of a fact data structure 50, having a linking between fact data structures, i.e., the parent fact pointer(s) 60 and the child fact pointer(s) 62, and the defining of a fact net as a data structure incorporating at least one fact data structure.

Deriving New Facts

It has been shown also that an evolved fact net includes multiple instances of individual fact data structures linked to one another. The manner in which the primitive fact nets are evolved into fact nets having multiple instances of linked fact data structures is best described with respect to the fact deriving agents, i.e., the inference agents 24 and the lookup agents 26 of FIG. 1.

The inference agents 24 define software objects which accept one or more facts as input and produce one or more new facts as output. An inference agent 24 includes both procedures and storage, and includes everything that is required to produce the output from the input. In FIG. 1, the output of the inference agent 24 is shown as a derived fact 25.

The inference agents 24 also include a class of agents which translate one fact into another fact. For example, a specific translation agent receives the alphanumeric string "IBM" and converts the string into an Internet Uniform Resource Locator ("URL") for an IBM home page by creating the new string "http://www.ibm.com". In another example, a specific translation agent receives the alphanumeric string "http://www.ibm.com" and converts it into the following alphanumeric string "IBM".

The lookup agents 26 define software objects which accept one or more facts as input and convert the input to an address which the lookup agent then uses to retrieve information from a source external to itself The lookup agent 26 then returns the retrieved information as its output. Though the lookup agent 26 also includes both procedures and storage, it does not include everything it needs to produce its output, since it requires that an information source 28 provide the information it ultimately returns as its output. In FIG. 1, the output of the lookup agent 26 is shown as a derived fact 29. For example, a specific lookup agent 26 receives the alphanumeric string "IBM" and converts it to a command to an Internet search engine, requesting headlines and corresponding URL's for information pertaining to "IBM", e.g., "http://search.yahoo.com/bin/search?p=ibm." The search command is in effect an address presented to the Internet Yahoo!™ search engine, corresponding to the information source 28 of FIG. 1.

The word "address" is used here in a very general sense. It includes a true address such as used to access information from a storage device. It also includes network commands used to retrieve information from network resources.

The creation of a fact is a two-step procedure. The first step involves deriving the new information which will become the fact data portion (52 of FIG. 4) of the completed fact. The second step involves creating an instance of the fact data structure (50 of FIG. 4) and placing the new information into the fact data portion 52 of the fact data structure 50. This two-step procedure is used by the observing agents 20, the inference agents 24, and the lookup agents 26 of FIG. 1.

Incorporating New Facts into Existing Fact Nets

In addition to creating new facts, the inference agents 24, and the lookup agents 26 are responsible for incorporating the new facts into an existing fact net. The agents do this by linking each new fact to a parent fact of the new fact. The parent fact has been previously incorporated into an existing fact net, or is a primitive fact and hence defines a primitive fact net, as described above.

Figure 6:
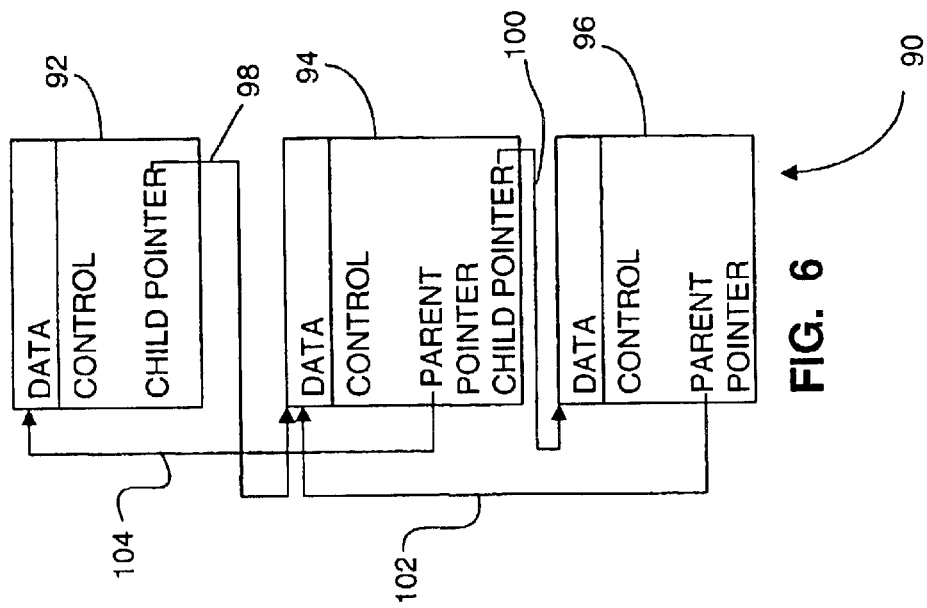
FIG. 6 is a schematic diagram which illustrates details of a linkage between fact data structures.

FIG. 6 is a schematic diagram which illustrates details of a linkage between three fact data structures. The linked data structures form a small fact net, designated generally by the numeral 90. The fact net 90 includes facts 92, 94, 96, each having a data portion and a control portion. A child pointer 98 of fact 92 points to fact 94, indicating that fact 94 is a child of fact 92. A parent pointer 104 of fact 94 points to fact 92, indicating that fact 92 is a parent of fact 94. In similar fashion a child pointer 100 of fact 94 points to fact 96, and a parent pointer 102 of fact 96 points to fact 94, indicating that fact 94 is a parent of fact 96.

Figure 5:
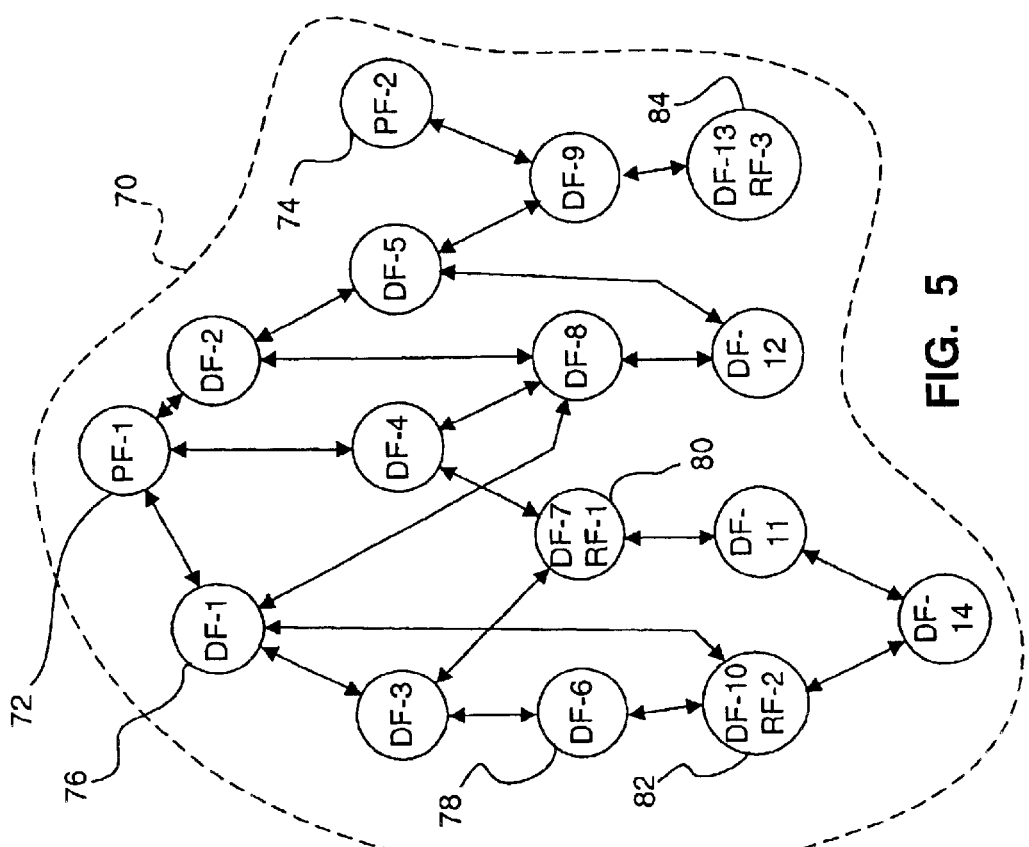
FIG. 5 is a schematic diagram illustrating a highly evolved network of linked fact data structures defining a fact net.

A person having an ordinary level of skill in the art will appreciate that the lines having arrowheads at both ends and connecting the circles in FIG. 5 represent linkages between facts within the fact net 70—a child pointer of a parent fact pointing to a child fact, and a parent pointer of the child fact pointing back to the parent fact.

Deciding What to Do: Defining Fact Type

The control portion 54 of the specific fact data structure illustrated in FIG. 4 includes the fact type field 56. In a specific embodiment of a user-centered push system 10

(FIG. 1), an agent which creates a fact (observer agent 20, inference agent 24, lookup agent 26) is responsible for defining the fact type and for entering the type into the fact type field 56 at the time of fact creation.

In another specific embodiment of the invention, the fact type is used by all agents to determine whether or not the fact is one which the agent can use to accomplish the agent's task. In other words, each agent looks for facts of a predefined type, different agents looking for different types of facts. When an agent finds a fact, or facts of the necessary type, the agent attempts to perform its predefined task using the fact(s) as input.

An Example of Fact Type

FIGS. 7–11 are a series of related schematic diagrams which illustrate an example of the functional operation of specific observer agents, deriving agents, and reporting agents in the user-centered push system of FIG. 1. The example demonstrates the importance of fact type in the user-centered push embodiments being described. The example begins by quickly summarizing what is shown in each of the diagrams, then continues in a more detailed manner.

Fact Type Example Summary

Figure 7:
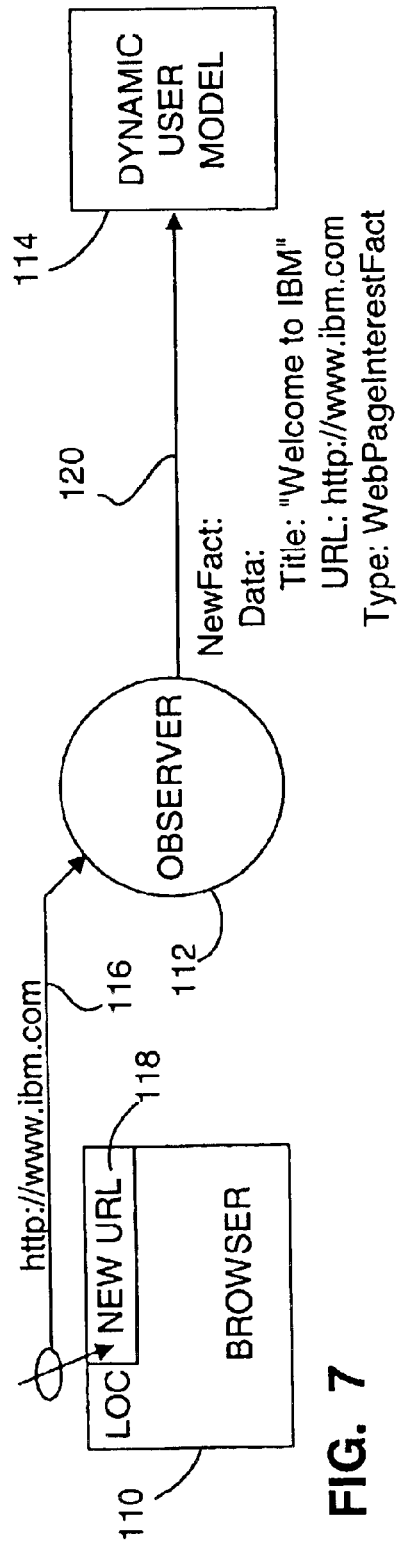
FIG. 7 is a schematic diagram illustrating monitoring a web browser to create a WebPageInterestFact.

In FIG. 7, an observer agent monitors a web browser to determine when the user inputs a new URL to access a new web page. Upon detecting a new URL, the observer agent creates a primitive fact containing the new URL and places the primitive fact into a Dynamic User Model.

Figure 8:
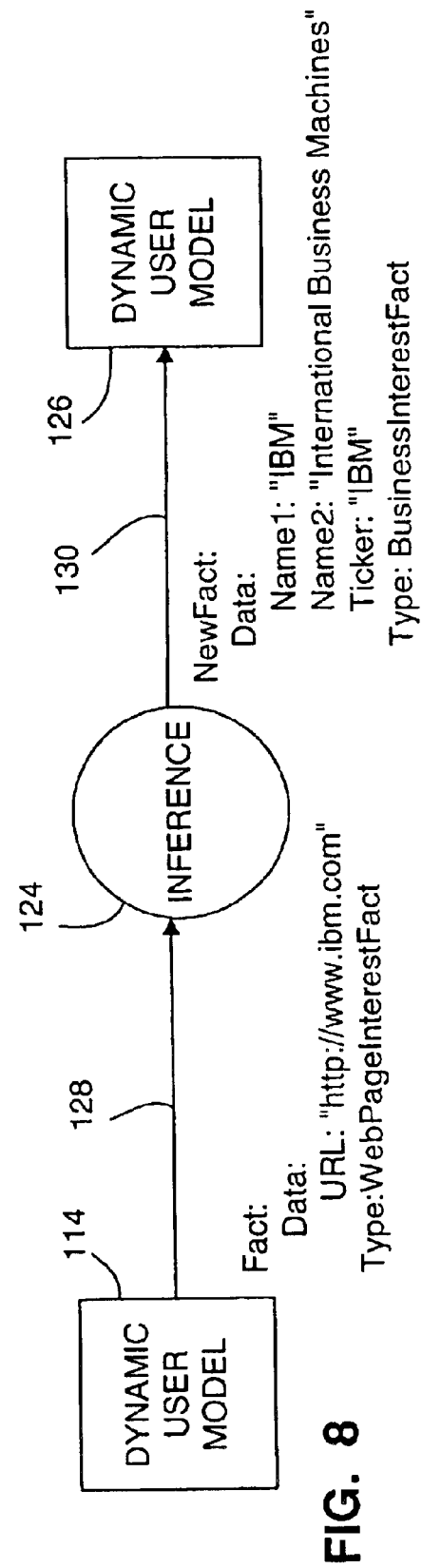
FIG. 8 is a schematic diagram illustrating deriving a new BusinessInterestFact from the WebPageInterestFact of FIG. 7.

In FIG. 8, an inference agent picks up the primitive fact and converts the URL to a business name corresponding to the URL. The inference agent creates a new fact containing the business name and places the new fact into the Dynamic User Model.

Figure 9:
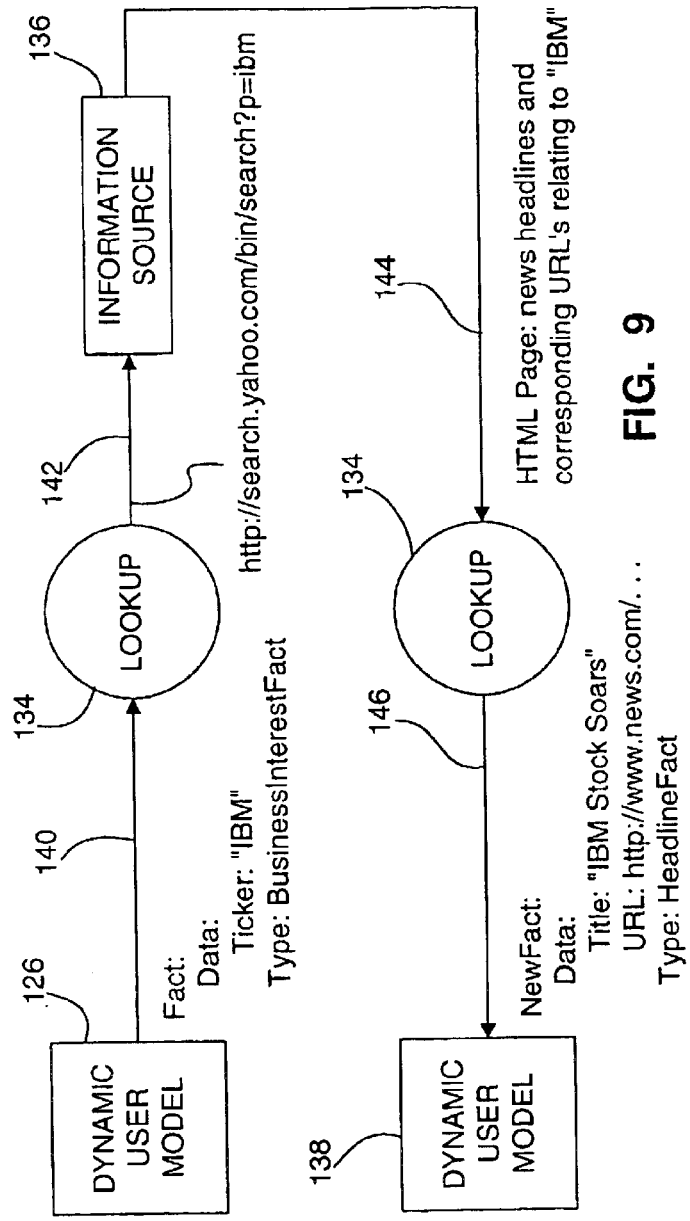
FIG. 9 is a schematic diagram illustrating using a BusinessInterestFact to retrieve HeadlineFacts and URL's from an Internet search engine.

In FIG. 9, a lookup agent converts the business name to an online search command, and uses the command to search an online database for news headlines relating to the business name. In this example, the lookup agent selects the most recent headline and the corresponding URL returned by the online database and creates a HeadlineFact including the headline and the corresponding URL and places the new fact into the Dynamic User Model.

Figure 3:
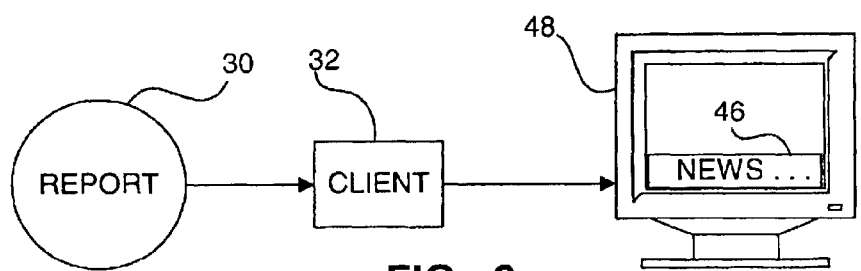
FIG. 3 is a partial block diagram illustrating another embodiment of the system of FIG. 1.
Figure 10:
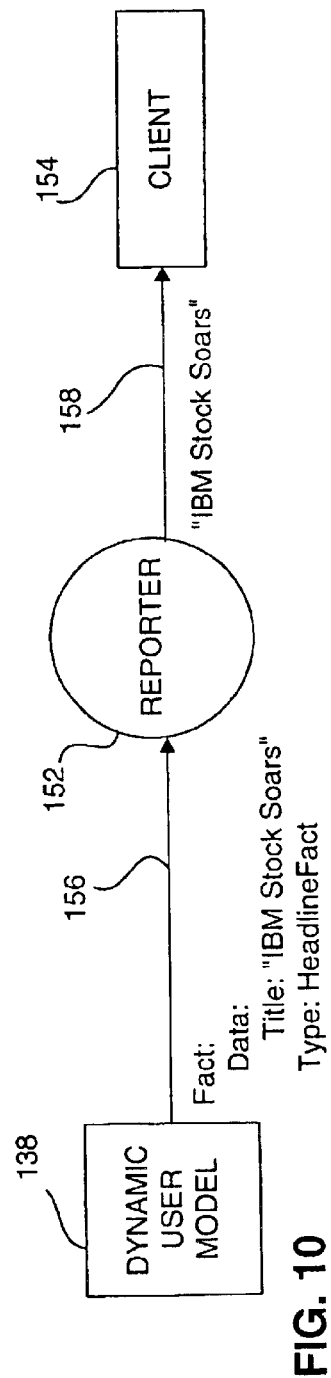
FIG. 10 is a schematic diagram illustrating reporting the HeadlineFacts of FIG. 9 to a client.

In FIG. 10 a reporter agent delivers the headline to a client for display in a "ticker tape" across the bottom of the user's display screen (FIG. 3).

Figure 11:
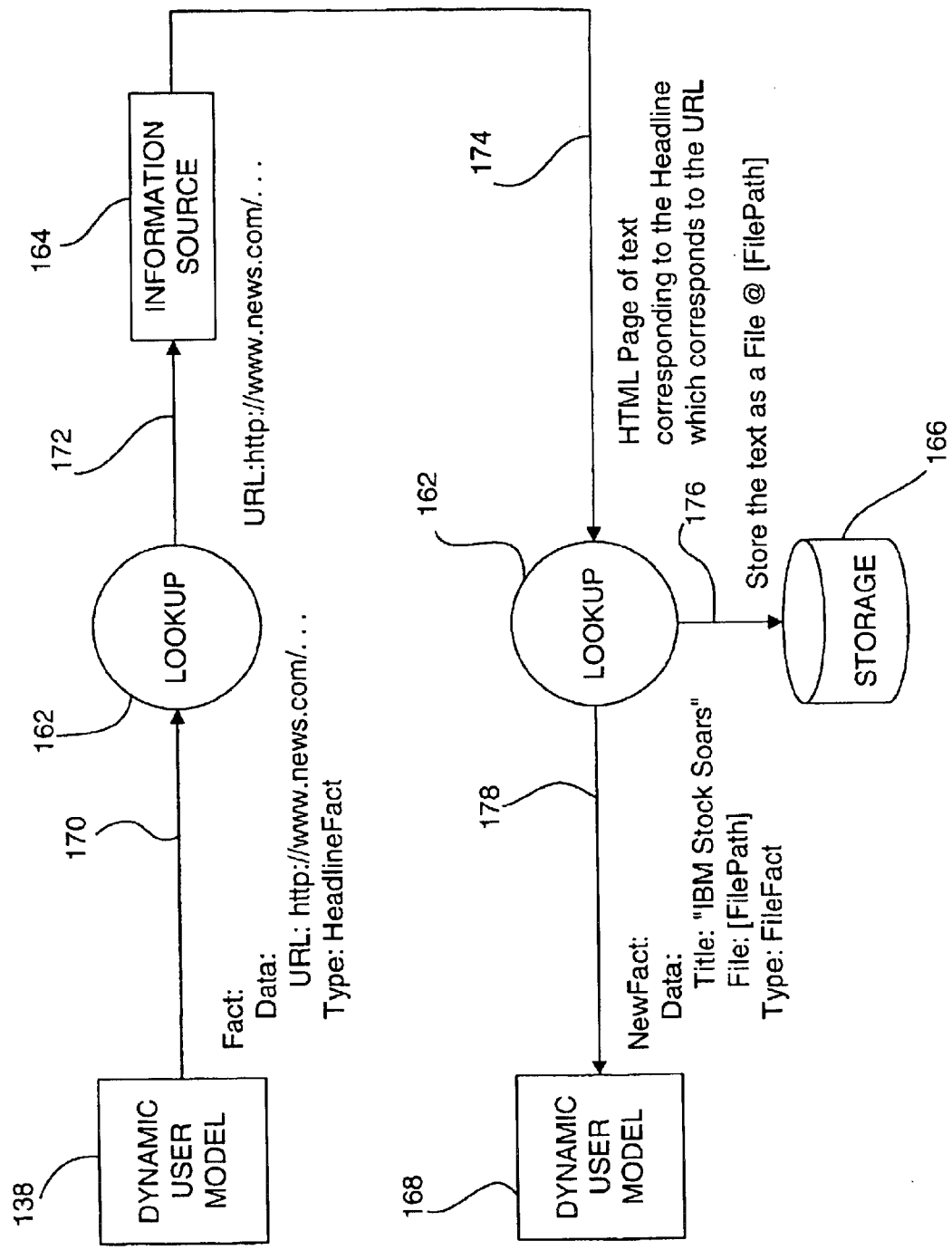
FIG. 11 is a schematic diagram illustrating using the URL's of FIG. 9 to retrieve corresponding news story texts and store them on a hard disk.

In FIG. 11 another lookup agent uses the URL corresponding to the headline to retrieve a corresponding news story from an online news source, stores the text for the story into a hard disk, and creates a new FileFact containing the headline and a DOS filepath for locating the corresponding story, and places the new FileFact into the Dynamic User Model.

Fact Type Example Details

FIG. 7 includes a browser 110, an observer agent 112, and a dynamic user model 114. The observer agent 112 monitors 116 a Location window 118 of the browser 110, waiting for the user to input a new URL. In this example the new URL is "http://www.ibm.com." The observer agent 112 creates an instance of a fact data structure (50 of FIG. 4) and obtains a title "Welcome to IBM" from the browser 110 and places the title and the new URL into the data portion 52 of the fact data structure. The observer agent also sets the fact type (56 of FIG. 4) to Web-Page-Interest-Fact, and places the new fact 120 into the dynamic user model 114.

FIG. 8 includes the dynamic user model 114, 126 and an inference agent 124. The dynamic user model is shown at both the left side 114 and the right side 126 of FIG. 8, but it will be understood that this is for convenience only as there is only a single dynamic user model, as shown in FIG. 1. The dynamic user model 114 includes the new Web-Page-Interest-Fact placed there by the observer agent 112 of FIG. 7.

The inference agent 124 uses the URL portion of the Web-Page-Interest-Fact 128 and creates a new fact of type Business-Interest-Fact. Into the data portion of the new fact the inference agent 124 places the name "IBM", the name "International Business Machines" and a stock ticker symbol "IBM". The new Business-Interest-Fact 130 is placed into the dynamic user model 126.

FIG. 9 includes the dynamic user model 126, 138, a lookup agent 134, and an information source 136. The dynamic user model 126, 138 and the lookup agent 134 are duplicated for convenience. The lookup agent 134 uses the stock ticker symbol "IBM" 140 of the Business-Interest-Fact 130 to create a search command 142 for the Yahoo!™ online database: "http://search.yahoo.com/bin/search?p=ibm." The search command is sent to the online database, information source 136, via the web. The online database responds via the browser with an HTML page containing headlines relating to information about IBM and URL's corresponding to the headlines for retrieval of news stories corresponding to the headlines. The lookup agent 134 accepts the HTML page and extracts from it the most recent headline and its corresponding URL. The lookup agent 134 uses this information to construct a new fact, having a data portion containing the headline "IBM Stock Soars," and the corresponding URL: "http://www.news.com/ . . . ", and having a fact type of Headline-Fact.

FIG. 10 includes the dynamic user model 138, a reporter agent 152, and a client 154. The reporter agent 152 uses the headline from the new Headline-Fact 156 and delivers the headline portion 158 "IBM Stock Soars" to the client 154. In the example, the client 154 sends the headline to a "ticker tape" window across the bottom of the user's display screen (see FIG. 3).

FIG. 11 includes the dynamic user model 138, 168, another specific lookup agent 162 (both duplicated for convenience), an information source 164, and a storage device 166. The lookup agent 162 uses the headline URL 170 "http://www.news.com/ . . . " of the new Headline-Fact 146 (FIG. 9) to access 172 an online news service, information source 164, via a browser (not shown). The online news service responds via the web with an HTML page of text 174 corresponding to the headline URL. The lookup agent 162 extracts the news text from the HTML page and stores the text 176 in the storage device 166. The storage address, or DOS filepath, for the news story is placed into a new fact of type File-Fact 178. The data portion of the new File-Fact includes a copy of the headline "IBM Stock Soars" and the filepath at which the headline's corresponding news story is stored on the storage device 166.

Though fact type is used in these embodiments to determine when agents shall respond to existing facts, it should be understood that other control structures and strategies are also useful to accomplish this purpose. The invention, though currently described in terms of fact type, is not so narrowly defined in the broadest claims.

Many Different Agents

As can be seen from the preceding example, the lookup agents 134 (FIG. 9) and 162 (FIG. 11), though similar in many respects, perform different tasks. The various embodiments of the user-centered push system 10 which have been described are all implemented in an object-oriented, message passing discipline. The use of the object-oriented model makes it possible to define a class of agents, each instance of which can be specialized to perform tasks such as those defined for the observing agent 112 (FIG. 7), the inference agent 124 (FIG. 8), the reporter agent 152 (FIG. 10), and the lookup agents 134 (FIG. 9) and 162 (FIG. 11). In a typical user-centered push system 10, there are many different agents all derived from a few basic object-oriented classes.

Figure 12:
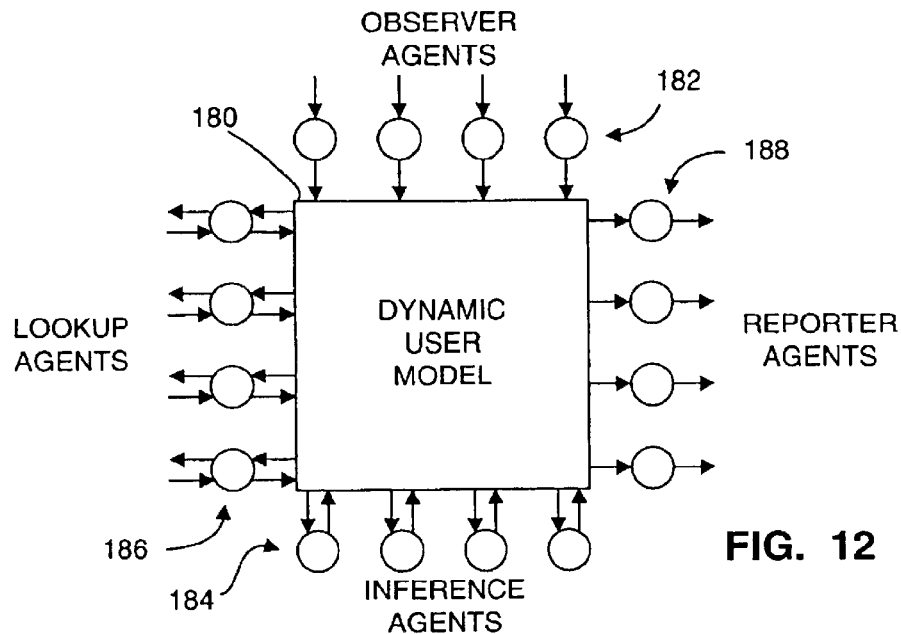
FIG. 12 is a partial schematic diagram which illustrates many agents clustered near and operating upon the contents of a dynamic user model.

FIG. 12 is a partial schematic diagram which illustrates many agents clustered near and operating upon the contents of a dynamic user model. The diagram includes a dynamic user model 180, a group of independent observer agents, designated generally by the numeral 182, a group of independent inference agents 184, a group of independent lookup agents 186, and a group of independent reporter agents 188. No significance should be given to the fact that each group includes exactly four agents. The number and type of agent in each group depends upon the specific embodiment. Four agents in each group is shown for convenience only in FIG. 12.

In the previous example one observer agent 112, one inference agent 124, two lookup agents 134, 162, and one reporter agent 152 were tailored to implement the process described. Additional agents, such as those shown in FIG. 12, and not described in the previous example, are present in all practical embodiments of the invention.

With respect to each class of agents shown in FIG. 12—each observer agent 182 is tailored to monitor some aspect of user-system interaction, and to create one or more primitive facts which are placed into the dynamic user model 180. Each inference agent 184 is self contained and looks for specific types of facts within the dynamic user model 180. Each inference agent creates a specific type of new fact(s) according to its task, placing the new fact(s) into the dynamic user model. Each lookup agent 186 looks for specific types of facts, uses these to access information from an information source (not shown) and creates a specific type of new fact(s) according to its task, placing the new fact(s) into the dynamic user model. Each reporter agent 188 looks for a specific type of fact, and delivers a copy of a specific portion of the fact to a specific client according to its task.

The information source 28 (FIG. 1) is any storage including a searchable database located outside a specific lookup agent, including multiple information sources. Thus in a specific embodiment, an information source is a table located within system memory. In another embodiment it is a hard disk, in another embodiment it is a CD ROM. In still other embodiments the information source is storage located in another agent. In another embodiment the information source is a database accessed via intranet. In another embodiment the information source is a database accessed via the Internet. It is impossible to predict all the forms of storage outside the specific lookup agent that an information source will take. These examples are meant to be illustrative only and not limiting upon the future development of information storage technology. In the most general sense, the information source is any storage located outside a specific lookup agent. And that feature distinguishes a lookup agent from an inference agent. The inference agents, as a class, contain all the information needed to perform a defined task.

Identifying Reportable Facts

A reportable fact is a fact of a type which a particular reporting agent has been instructed to look for and report. In the example above, the reporter 152 (FIG. 10) is instructed to look for Headline-Facts and to extract the headline from the data portion of the fact. Identifying a reportable fact therefore includes defining a fact type for each fact, and creating an agent for reporting facts to a client and responsive to facts of at least one defined type.

Pushing Information

A reporting agent "pushes" a fact by obtaining a copy of the fact from a fact net and then delivering the copy to a client. In the previous example, the reporting agent 152 (FIG. 10) obtained a copy 156 of a Headline-Fact 146 (FIG. 9), extracted the headline 158 from the data portion of the Headline-Fact, and delivered, or "pushed" the headline to the client 154. In that sense, the reporting agent 152 is the client's agent.

Defining a Client

A "client" is an object (also an "application program") that pushes facts for viewing by the user (see FIG. 3 and the associated description). Such was the task of the client 154 of FIG. 10. In another specific example of a client, the client pushes predefined facts to a storage device for later use. For example, a specific reporter (not shown) retrieves the File-Facts from the dynamic user model 168 (FIG. 11), and retrieves the news stories from the storage 166. The specific client formats the information for transfer via HotSync™ to a user's PalmPilot™ and stores the formatted information back into the storage 166. In that sense, the client is an object (or "application program") that archives facts for later use. HotSync™ and PalmPilot™ are Trademarks of U.S. Robotics, Inc.

A Dynamic User Model

Thus a person having an ordinary level of skill in the relevant arts will appreciate that a collection of all fact nets defines a dynamic user model 22 (FIG. 1). The user model is referred to as "dynamic" because new fact nets are constantly being created by new user activity, and existing fact nets are constantly evolving in the direction of recognizable probable user interests of a reasonable degree of confidence.

In a specific embodiment of the user-centered push system 10 (FIG. 1) the contents of the dynamic user model 22 is saved at the end of an operating session of the information processing system. The contents are then restored at the start of a next session, permitting the model 22 to define user activity and resulting inferences across operating sessions.

Figure 13:
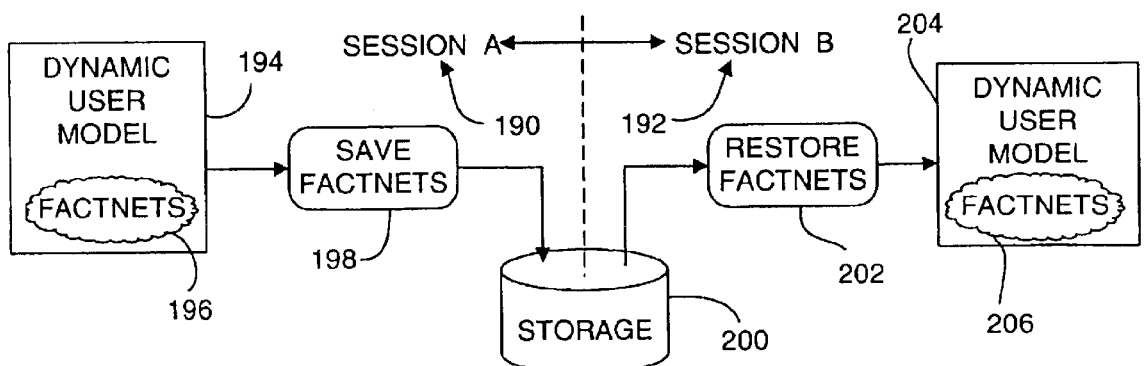
FIG. 13 is a schematic diagram illustrating the maintaining of a dynamic user model across operating sessions.

This feature of the invention is illustrated by FIG. 13 which is a schematic diagram and includes representative, sequential operating sessions A and B, designated by the numerals 190 and 192, respectively. Session A includes a dynamic user model 194 containing final session fact nets 196. The final fact nets 196 are saved 198 on a system storage device 200, such as a hard disk. At the start of session B, the fact nets previously saved on the system storage device 200 are restored 202 to a new dynamic user model 204. In this manner, it is possible to resume operation with a copy of the session A fact nets 196 defining the initial dynamic user model fact nets 206.

Figure 14:
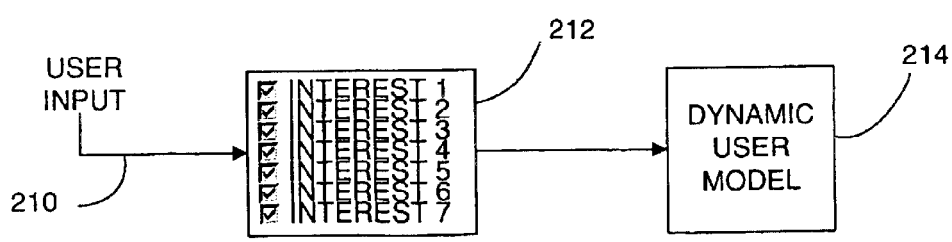
FIG. 14 is a schematic diagram illustrating the use of a user interest checklist to augment a dynamic user model.

One of the features which distinguishes the present invention over prior art push technologies is the use of the dynamic user model as opposed to a reliance on a static user interest checklist. In a specific embodiment of the present invention, a static user interest checklist (also known as a user "preference" checklist) is available for initializing a dynamic user model. This feature is illustrated by FIG. 14, a schematic diagram which includes a user input 210, a static user interest checklist 212, and a dynamic user model 214. The checklist 212 contains a list of anticipated user interests, each of which may be checked off or not checked off by the user input 210. The contents of the checklist 212 is then incorporated into the dynamic user model 214 by agents similar to the observer agents 182 (FIG. 12).

Triggering on User Activity

Figure 15:
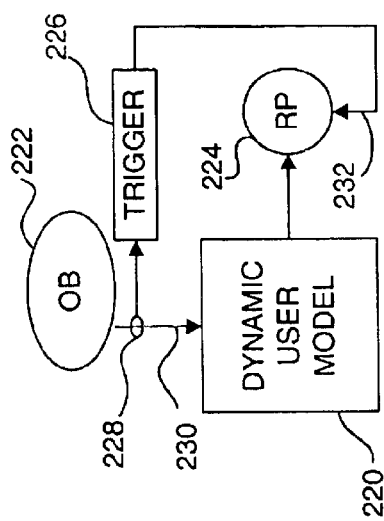
FIG. 15 is a partial schematic diagram which illustrates the triggering of information delivery upon user activity.
Figure 17:
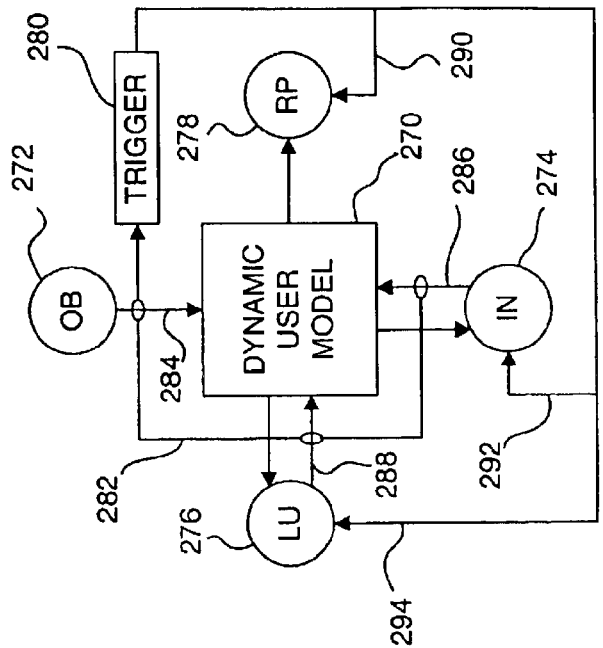
FIG. 17 is a partial schematic diagram which illustrates the triggering of fact net evolution and information delivery upon new fact creation.
Figure 16:
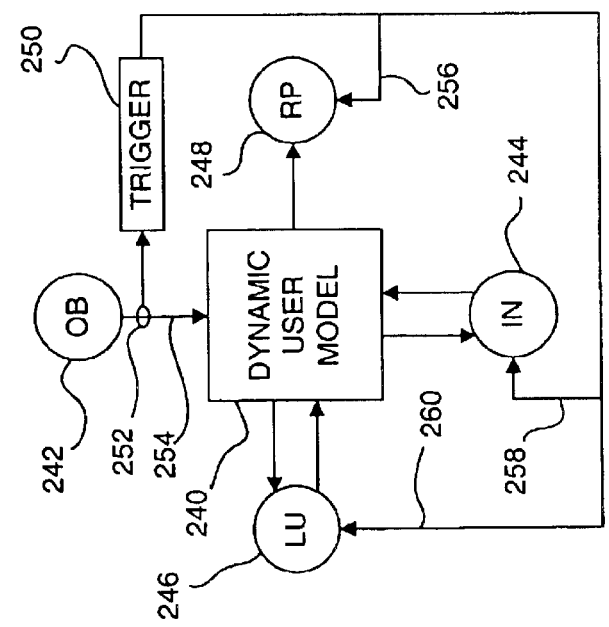
FIG. 16 is a partial schematic diagram which illustrates the triggering of fact net evolution and information delivery upon user activity.

FIGS. 15, 16 and 17 are partial schematic diagrams which illustrate three embodiments of an activity triggering feature of the user-centered push system.

FIG. 15 includes a dynamic user model 220, an observer agent 222, a reporter agent 224, and a trigger function 226. The trigger 226 monitors 228 the creation of a new primitive fact 230 by the observer agent 222, causing the reporter agent 224 to be triggered 232. The triggered reporter agent 224, upon being triggered 232, examines the contents of the dynamic user model 220 to determine whether any fact exists of a type which the reporter agent 224 is tasked to deliver to a client. If such a fact is present, a copy of the appropriate portion of the fact is obtained by the reporter agent 224, and the copy is delivered to the client (not shown). If no such fact exists, the reporter agent 224 returns to a quiescent state upon completion of its examination of the contents of the dynamic user model 220. In the embodiment illustrated by FIG. 15, reporting is triggered upon the detection by the observer agent 222 of user activity. In a typical user-centered push system using this specific trigger embodiment, detected user activity will initiate an interval of reporting. Hence the pushing of information is said to be triggered upon user activity.

FIG. 16 includes a dynamic user model 240, an observer agent 242, an inference agent 244, a lookup agent 246, a reporter agent 248, and a trigger function 250. The trigger 250 monitors 252 the creation of a new primitive fact 254 by the observer agent 242, triggering the inference agent 244, the lookup agent 246, and the reporting agent 248. Any of these agents which is in a quiescent state is activated upon being triggered, and begins attempting to carry out its specific task. In the embodiment illustrated by FIG. 16, fact deriving and reporting are triggered upon the detection by the observer agent 222 of user activity. In a user-centered push system using this specific embodiment, detected user activity initiates a round of fact derivation and reporting.

FIG. 17 includes a dynamic user model 270, an observer agent 272, an inference agent 274, a lookup agent 276, a reporter agent 278, and a trigger function 280. The trigger 280 monitors 282 the creation of any new fact 284, 286, 288. In this specific embodiment, the creation of a new fact 284, 286, 288 triggers 290 the reporter agent 278, triggers 292 the inference agent 274, and triggers 294 the lookup agent 276. Any of these agents which is in a quiescent state is activated upon being triggered, and begins attempting to carry out its specific task. In the embodiment illustrated by FIG. 17, fact deriving and reporting are triggered upon the detection by the trigger 290 of the creation of any new fact. In a user-centered push system using this specific embodiment, user activity initiates a round of fact derivation and reporting, but the fact derivation process prolongs the period of activity until no new facts are created and all reportable facts have been delivered. Here, the triggering of the information pushing occurs as a result of changes in the contents of the dynamic model 270.

Such a process as illustrated in FIG. 17 and as described here defines an iterative process of re-evaluation and reporting. The process results in every possible derivable and reportable fact being derived and reported before the activity returns to a quiescent state.

Prior art push technologies trigger the delivery of information upon changes in the world outside the user environment. Something happens in the world, information changes, and the user is notified. User-centered push, on the other hand, is the tying of user activity to the creation of the dynamic user model, which in turn initiates the search for, and the reporting of, information.

Concurrent Threads

In a specific embodiment of the invention, the inference agents 184 (FIG. 12), the lookup agents 186, and the reporter agents 188 are independent objects implemented in an object-oriented, message-passing style. These agents are best understood as operating independently and at the same time, i.e., concurrently. Each agent has an assigned task—examine the contents of the dynamic user model 180 looking for facts needed to complete its task, and if the facts are not present, waiting until the facts are present, and if the facts are present, using the facts to carry out the task.

Thus in the fact type example presented above (FIGS. 9–11), the inference agent 124, the lookup agents 134, 162, and the reporter agent 152 each begins looking at the contents of the dynamic user model as soon as the observer agent 112 places the primitive fact "Welcome to IBM" into the user model 114 (FIG. 7). The inference agent 124 is the first to find the fact it needs to complete its task (FIG. 8). That permits the lookup agent 134 (FIG. 9) to complete its task. And so on.

As stated above, one embodiment of the invention is as a method comprising a series of steps. In a specific embodiment of the method, the concurrency of agent behavior is achieved by repeating the method steps until stopped. In a different embodiment of the method, the steps are executed concurrently as independent programming threads.

In other specific embodiments in which the invention defines a user-centered push system, all agents, including the observer agents, operate as independent, concurrent programming threads.

Pruning Expired Facts

The discussion to this point has described how facts are created and are used to begin new fact nets and to enlarge existing fact nets. In specific embodiments of the invention, facts which have expired are eliminated from the dynamic user model. When this occurs, all descendants of an expired fact are also eliminated. This process is referred to as pruning. An expired fact is also known as a no-longer-valid fact. Facts eliminated through pruning are said to be pruned from the fact nets.

When a fact is created, the creating agent is responsible for setting a time of creation 64 (FIG. 4) and a time of expiration 66 (FIG. 4). The phrases "time of creation" and "time of expiration" are intended to indicate the concept of a fact having a defined date and time at which it comes into existence, and having a defined lifetime. These parameters are expressed in alternative ways in specific embodiments. The agent that creates a new fact is responsible for setting the time of creation parameter and for setting the time of expiration parameter.

In a specific embodiment of the user-centered push system 10 (FIG. 1) a special class of agents (not shown in FIG.

Figure 18:
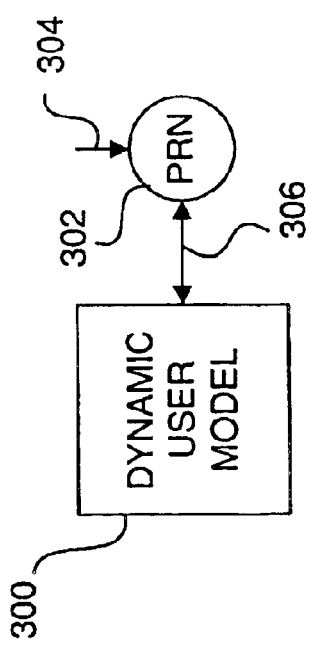
FIG. 18 is a partial schematic diagram illustrating an agent for pruning no-longer-valid facts from a dynamic user model.

1) is defined for examining the contents of the dynamic user model 22 and pruning any facts and their descendants which have expired. These relationships are illustrated in FIG. 18, a partial schematic diagram showing a portion of a user-centered push system.

The illustrated portion includes a dynamic user model 300, an expired-fact pruning agent 302 which is triggered by an input line 304. When triggered, the pruning agent 302 examines the contents of the dynamic user model 300 looking for facts which have expired. Upon encountering such a fact, the pruning agent 302 removes 306 the expired fact and all its descendants from the dynamic user model 300.

Figure 19:
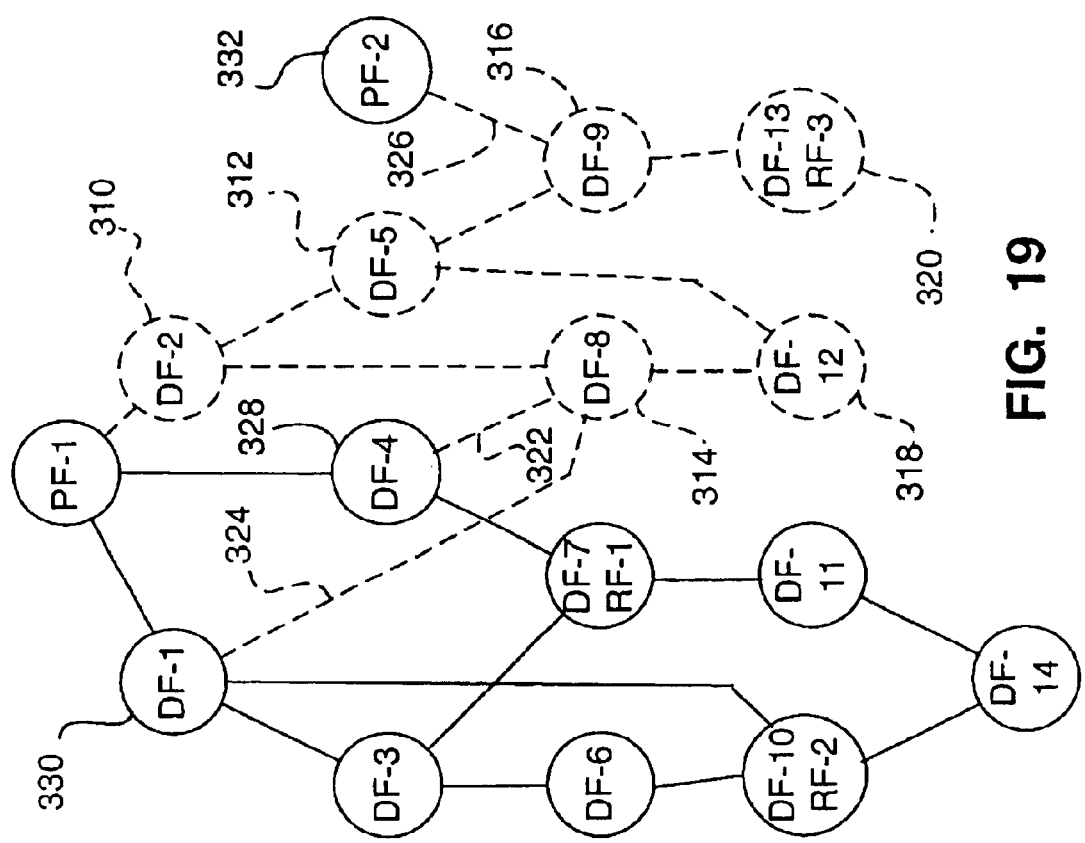
FIG. 19 is a schematic diagram based on the fact net of FIG. 5 and illustrating a process of pruning no-longer-valid facts and their descendants from a fact net.

FIG. 19 is a schematic diagram based on the evolved fact net of FIG. 5. FIG. 19 illustrates the process of pruning an expired fact, derived fact 310, and all its descendants—derived facts 312, 314, 316, 318 and 320. Primitive fact 332 is not descended from derived fact 310. The process of pruning an expired fact and its descendants sometimes requires the elimination of linkages between existing facts and pruned facts. See for example the eliminated linkages 322, 324 and 326.

A first fact is a descendant of a second fact if the first fact is a child of the second fact or is a child of a descendant of the second fact. This recursive definition means that in a specific embodiment, the pruning agent 302 (FIG. 18) locates the descendants of the derived fact 310 (FIG. 19) by examining the child pointers for derived fact 310. These pointers point to derived facts 312 and 314. Then the pruning agent is free to eliminate the expired fact 310. Next the pruning agent examines the child pointers of derived facts 312 and 314 and locates derived facts 316 and 318, and in this manner eventually locates derived fact 320. These descendants of the derived fact 310 are eliminated. The pruning agent 302 must also eliminate child pointers of derived facts 328 and 330 which point to eliminated fact 314, and of primitive fact 332, which points to eliminated fact 316.

Recreating an Eliminated Expired Fact

It is the responsibility of an agent which has created a fact to recreate the fact if the fact has expired, or otherwise been eliminated (as for example when its parent fact was eliminated). The fact creating agent has access to all information relevant to the question of whether a particular fact shall be recreated. When the task of a deriving agent or a lookup agent includes replacing (recreating) an expired or eliminated fact, the agent examines the contents of the dynamic user model looking for facts necessary to create its fact. When those facts exist within the model, the agent recreates the fact and incorporates the recreated fact into an existing fact net.

Observing Beyond the User

Figure 20:
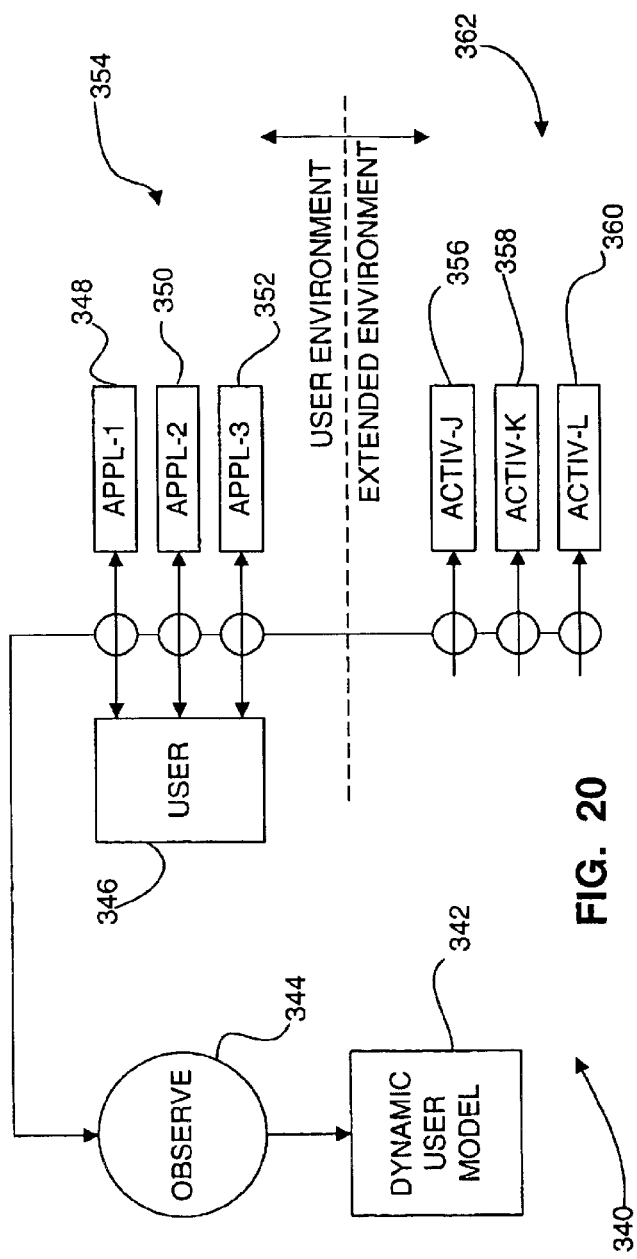
FIG. 20 is a partial schematic diagram illustrating an extension of a monitored environment beyond a user environment.

FIG. 20 is a partial schematic diagram illustrating a portion of a user-centered push system, designated generally by the numeral 340. The system 340 includes a dynamic user model 342, observer agents 344, a user 346 and user-invoked applications 348, 350 352. The user 346 and the user-invoked applications 348–352 define a user environment, designated generally by the numeral 354. Some observer agents 344 monitor activities lying beyond the user environment 354. These activities 356, 358, 360 define an extended environment, designated generally by the numeral 362.

The user 346 does not directly interact with events in the extended environment 362. For this reason, a broken line is used to divide the user environment 354 from the extended environment 362. Examples of events within an extended environment 362 include, but are not limited to, the status of a network printer, and various sensors used as part of a feedback process controlled by the information processing system.

By extending the push system monitoring environment beyond the user, a more powerful system is defined.

Adjusting for Confidence

In a specific embodiment of a user-centered push system, each fact includes a "fact confidence level" control field 68 (FIG. 4). The confidence level is a numeric value which is set to an initial value at the time of fact creation by the fact-creating agent.

Agents which use a fact, rely upon its confidence level to determine whether and to what extent they are likely to obtain useful results by using the fact to create a new fact, or to report the fact to a client.

Agents which create the fact and set the initial value for the confidence level 68 are responsible for adjusting its value, making it greater when the fact is determined to be of greater reliability, and making it less which the fact is determined to be of less reliability.

More Examples

Figure 21:
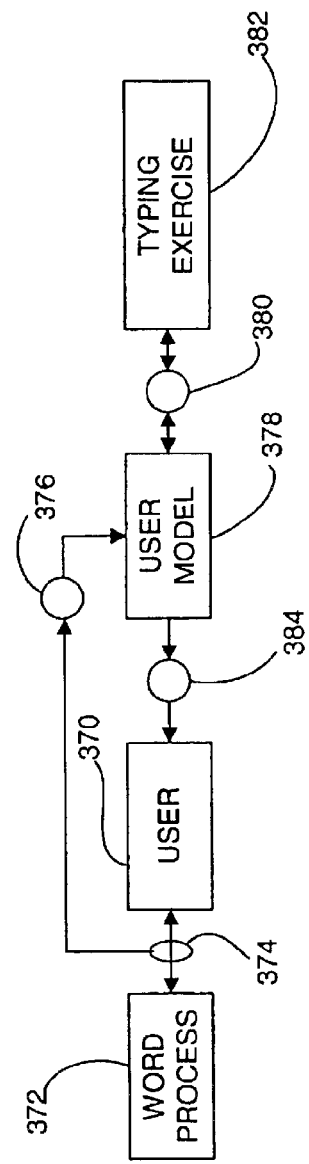
FIG. 21 is a partial schematic diagram illustrating a specific user-centered push system application.

FIG. 21 is a partial schematic diagram illustrating a user-centered push system in which a user 370 interacts with a word processor 372. The interaction is monitored 374 by an observer agent 376 which creates primitive facts defining keystroke activity of the user interaction. These primitive facts are placed into a dynamic user model 378. A fact deriving agent 380 uses the keystroke activity information within the dynamic user model 378 to develop a customized typing exercise 382 which is tailored to the particular typing errors being made by the user 370. The fact deriving agent 380 creates reportable facts relating to the customized typing exercise 382 and places these facts into the dynamic user model 378. Finally, a fact reporting agent 384 pushes the customized typing exercise 382 to the user 370.

Figure 22:
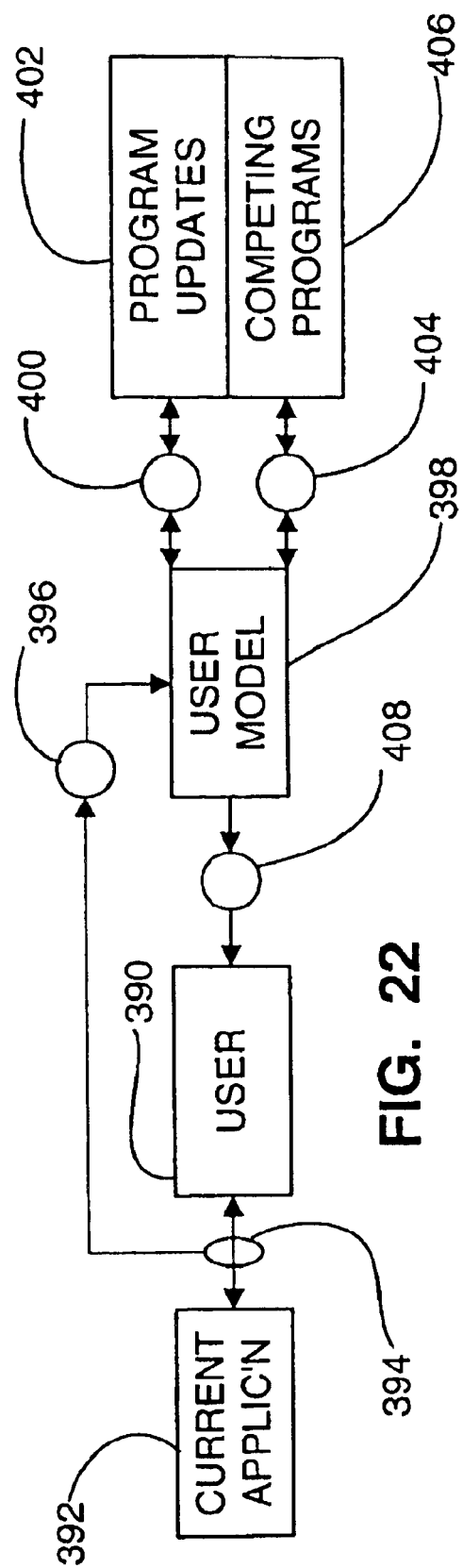
FIG. 22 is a partial schematic diagram illustrating another specific user-centered push system application.

FIG. 22 is a partial schematic diagram illustrating a user-centered push system in which a user 390 interacts with an application program 392. The user-application interactions are monitored 394 by an observer agent 396 which creates primitive facts defining the monitored interactions and places these facts into a dynamic user model 398. A first fact deriving agent 400 uses the primitive facts relating to the user-application interaction to locate and to retrieve information 402 relating to the newest bug fixes and program updates for the particular application program 392. The first fact deriving agent 400 creates reportable facts describing the available program updates 402 and places these facts into the dynamic user model 398. A second fact deriving agent 404 uses the primitive facts relating to the user-application interactions to locate and to retrieve information 406 relating to competing products which perform the same or similar application. The second fact deriving agent 404 creates reportable facts describing available competing products and places these facts into the dynamic user model 398. Finally, a fact reporting agent 408 pushes the facts describing program updates 402 and competing programs 406 to the user 390.

While the invention has been described in relation to the embodiments shown in the accompanying Drawing figures, other embodiments, alternatives and modifications will be apparent to those skilled in the art. It is intended that the Specification be only exemplary, and that the true scope and spirit of the invention be indicated by the following claims.

What is claimed is:

1. A method for pushing information to a client in an information processing system, the method comprising the steps of:
   providing a platform implementing the information processing system and a system client for practicing the method;
   gathering facts concerning user activity;
   forming the gathered facts into fact nets;
   storing the fact nets within the platform-implemented system;
   identifying fact nets defining evolving probable user interests; and
   pushing selected facts from the identified fact nets to the system client.

2. The method as set forth in claim 1, including the steps of deriving new facts from the facts within the fact nets, and incorporating the new facts into the fact nets.

3. The method as set forth in claim 1, including the step of repeating all steps until stopped.

4. The method as set forth in claim 3, wherein the repeating step includes executing the previous steps concurrently as independent threads.

5. The method as set forth in claim 4, including the steps of defining a no-longer-valid fact, and pruning no-longer-valid facts from the fact nets.

6. The method as set forth in claim 2, including a step of triggering the deriving and the pushing steps upon the formation of the fact nets.

7. The method as set forth in claim 6, wherein the triggering occurs upon the derivation of new fasts, thereby defining an iterative process of reevaluation and reporting.

8. The method as set forth in claim 7, including a step of deriving every possible fact that can be derived each time a new fact is added.

9. The method as set forth in claim 1, wherein the client is an application program that displays facts for user viewing.

10. The method as set forth in claim 1, wherein the client is an application program that archives facts for later use.

11. A system for pushing information to a client in an information processing system, the system comprising:
    means for gathering facts concerning user activity and for forming the gathered facts into fact nets;
    means for identifying fact nets defining evolving probable user interests;
    means for pushing selected facts from the identified fact nets to a system client; and
    single platform means implementing the system and the client.

12. The system as set forth in claim 11, including means for deriving new facts from the facts within the fact nets, and for incorporating the new facts into the fact nets.

13. The system as set forth in claim 11, including means for continuing until stopped.

14. The system as set forth in claim 13, wherein said continuing means further includes each of said previous means defining concurrent, independent program threads.

15. The system as set forth in claim 14, further including means for defining a no-longer-valid fact, and for pruning no-longer-valid facts from the fact nets.

16. The system as set forth in claim 12, including means for triggering the deriving means and the pushing means upon the formation of the fact nets.

17. The system as set forth in claim 16, wherein the triggering occurs upon the derivation of new facts, thereby defining an iterative means of reevaluation and reporting.

18. The system as set forth in claim 17, including means for deriving every possible fact that can be derived each time a new fact is added.

19. The system as set forth in claim 11, wherein the client is an application program that displays facts for user viewing.

20. The system as set forth in claim 11, wherein the client is an application program that archives facts for later use.

21. A system for monitoring events in an environment, for making inferences about the monitored events, and for reporting selected inferences to a client, the system comprising:
    at least one observer agent for monitoring a selected event of an environment, and for creating a primitive fact which incorporates a status of the monitored event;
    a dynamic user model for storing created facts, the stored facts being accessible by the agents; and
    at least one reporter agent for examining created facts, for defining and identifying reportable facts, and for delivering a copy of the reportable facts to a receiving client.

22. The system as set forth in claim 21, wherein the at least one observer agent, and the at least one reporter agent each defines an independent, concurrent programming thread.

23. The system as set forth in claim 22, wherein the at least one reporter thread is triggered by the creation of each new primitive fact, whereby delivery of reportable facts to a client is triggered by occurrence of monitored events.

24. The system as set forth in claim 21, including at least one fact deriving agent for examining all existing facts, for creating new facts from one or more existing facts, and for linking each new fact to a parent fact of the new fact, forming fact nets of linked facts, and further including all fact nets being stored in the dynamic user model.

25. The system as set forth in claim 24, including a fact pruning agent defining a no-longer-valid fact and a descendant of a fact, the fact pruning agent eliminating each no-longer-valid fact and all its descendants from the fact nets.

* * * * *